C. T. & J. B. MESSINGER.
Grain Screen.
No. 49,429.  Patented Aug. 15, 1865.
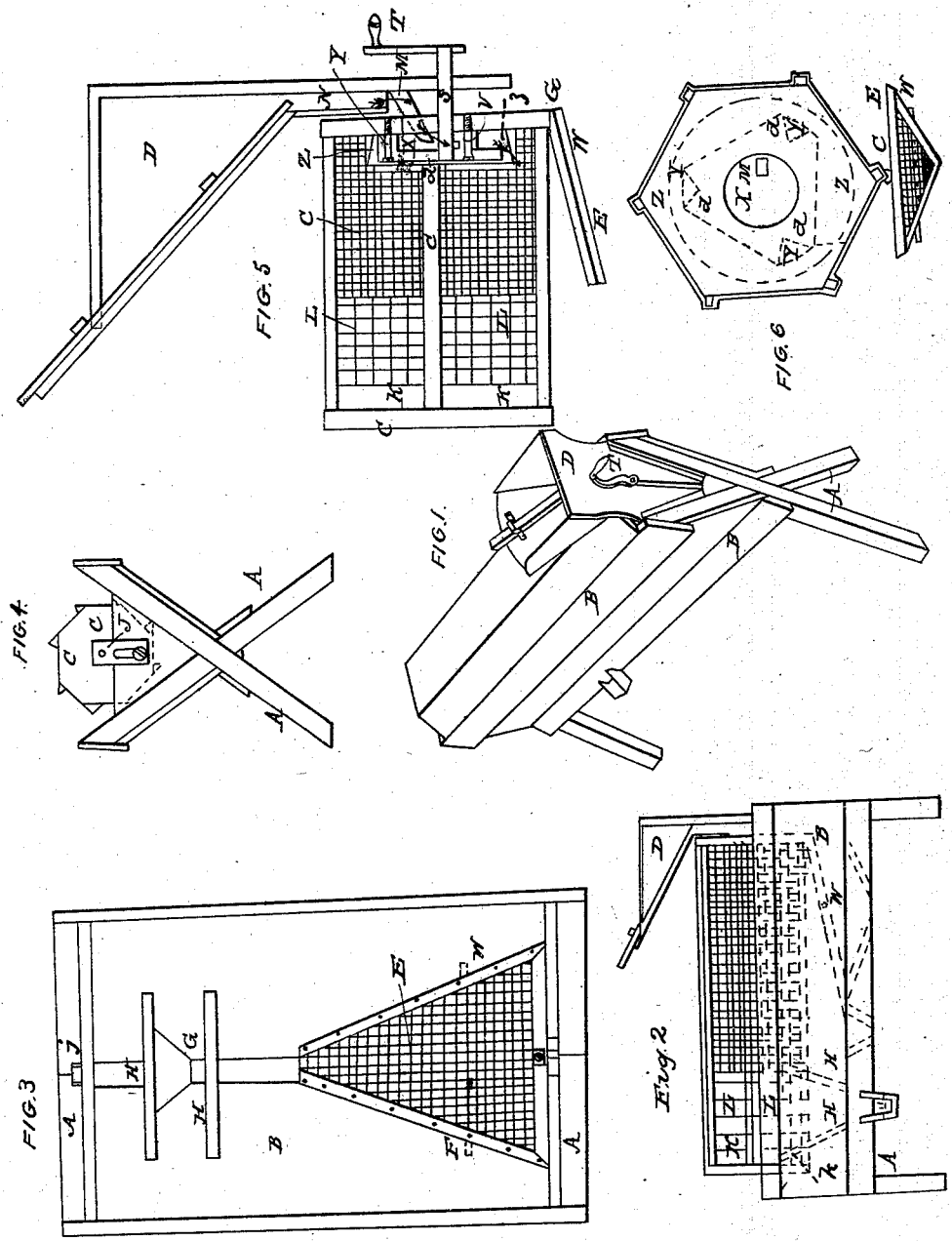
WITNESSES
J. C. Kennedy
R. S. Miller
INVENTORS
Charles T. Messinger
Joseph B. Messinger

UNITED STATES PATENT OFFICE.

CHAS. T. MESSINGER AND JOS. B. MESSINGER, OF LOGANSPORT, INDIANA.

IMPROVED GRAIN-SCREEN.

Specification forming part of Letters Patent No. 49,429, dated August 15, 1865; antedated August 11, 1865.

*To all whom it may concern:*

Be it known that we, CHARLES T. MESSINGER and JOSEPH B. MESSINGER, of the city of Logansport, in the county of Cass and State of Indiana, have invented new and useful Improvements in Grain-Screens for Screening and Separating Grain; and we do hereby declare that the following is a full and exact description thereof, reference being had to the accompanying drawings, and to the letters of reference marked thereon, making part of this specification, in which—

Figure 1 is a perspective view of the machine complete. Fig. 2 is a side elevation. Fig. 3 is a sectional plan. Fig. 4 is an end elevation; Fig. 5, a transverse section of hopper and cylinder. Fig. 6 is an end view of the cylinder.

The nature of our invention consists, first, in leaving an open space between the termination of the screen-wire and the cylinder-head, out of which passes sticks, straws, &c.; second, in providing, in addition to the screen-wire on the drum or cylinder, a grass-seed screen, which is placed immediately under the drum and on a pivot, and vibrated by the ribbed surface of the drum or cylinder-head, the object being to separate grass-seed from the chess and cockle; third, in providing an adjustable bearing, by which means the drum or cylinder can be adjusted so as to run the grain through fast or slow, as is desirable; fourth, in the arrangement of the hopper-spout and drum or cylinder head to keep up a continuous flow of grain to be screened into the drum or cylinder.

To enable others skilled in the art to make and use our invention, we will proceed to describe its construction and operation.

We construct our frame and box in the form as shown in Fig. 1, in which A A is the frame. B B is the box, and D is the hopper; T, the crank. But to facilitate the operation of getting the grain into the drum C, Figs. 2 and 5, we provide a hopper, D, Fig. 6, having a flue, N, and spout M, which passes through the hole in the cylinder-head X, Figs. 5 and 6, having a three-cornered board, *d d d*, secured by screws through the triangular pieces Y Y Y, around which the flange Z extends; the shaft *s*, Fig. 5, passing through the three cornered board *d d d*. To the shaft S is attached the crank T.

When the grain is put into the hopper it passes down the flue N and spout M into the cylinder or drum *c*, as indicated by the darts in the three-cornered board *d d d*, and the flange Z preventing it from rebounding out at the hole X, the grain passing through the drum over the wire-cloth, having a mesh of proper size to take out the cockle and grass-seed which fall on the grass-seed screen E, Figs. 2, 3, 5, and 6, the grass-seed screen being hung in the center on pivots W, having in the top of the frame a screw, G, Figs. 5 and 6, against which the ribs on the cylinder-head strikes in its revolutions, thus jarring the screen E, and the grass-seed passes through. The screw G can be run up or down, and thus jar or agitate the screen F more or less, as is necessary. A wire sieve of larger mesh is provided, as shown at L L, Figs. 2 and 5, through which the clean grain passes in between the partition H H, Figs. 2 and 3, into the spout U. In addition, we have an open space, as shown at K K, Figs. 2 and 5, through which pass sticks, stones, straws, &c. But in order to prevent the grain from passing too rapidly through the drum or cylinder C we provide an adjustable bearing, J, Fig. 4. By means of the slot and screw it can be raised or lowered, thus adjusting the cylinder or drum or inclining it more or less, as desirable, by which means the grain is run through faster or slower.

What we claim, and desire to secure by Letters Patent of the United States, is—

The cylinder C, in combination with the screen E, the several parts being constructed, arranged, and operated as and for the purpose specified.

CHARLES T. MESSINGER.
JOSEPH B. MESSINGER.

Witnesses:
J. C. KENEDY,
R. S. MILLER.